(12) United States Patent
Tanaka

(10) Patent No.: US 11,332,331 B2
(45) Date of Patent: May 17, 2022

(54) MATERIAL SUPPLY DEVICE AND FIBER BODY GENERATION APPARATUS

(71) Applicant: SEIKO EPSON CORPORATION, Tokyo (JP)

(72) Inventor: Hiroshi Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 16/827,775

(22) Filed: Mar. 24, 2020

(65) Prior Publication Data
US 2020/0307927 A1 Oct. 1, 2020

(30) Foreign Application Priority Data

Mar. 26, 2019 (JP) .............................. JP2019-057884

(51) Int. Cl.
*B65H 1/20* (2006.01)
*B65H 5/02* (2006.01)

(52) U.S. Cl.
CPC ............... *B65H 1/20* (2013.01); *B65H 5/021* (2013.01); *B65H 2701/174* (2013.01)

(58) Field of Classification Search
CPC ........... Y02W 30/64; D21B 1/32; B65H 1/20; B65H 2701/174
See application file for complete search history.

(56) References Cited

U.S. PATENT DOCUMENTS

| 2002/0179752 A1* | 12/2002 | Spencer | .................... D21B 1/32 |
| | | | 241/21 |
| 2016/0121564 A1* | 5/2016 | Oguchi | .................. D04H 1/732 |
| | | | 264/40.4 |
| 2020/0173102 A1* | 6/2020 | Aoyama | .................. D21B 1/32 |

FOREIGN PATENT DOCUMENTS

| CN | 112093517 A | * 12/2020 | ............... D21B 1/34 |
| JP | 2014-134209 A | 7/2014 | |

* cited by examiner

*Primary Examiner* — Howard J Sanders
(74) *Attorney, Agent, or Firm* — Global IP Counselors, LLP

(57) ABSTRACT

A material supply device includes a supply section that supplies a small piece made of a material containing a fiber, a weight measurement section that detects a weight of the small piece supplied from the supply section to a receiving portion, and a supply amount adjustment section that adjusts a supply amount per unit time of the small piece supplied by the supply section, based on a detection result detected by the weight measurement section. The supply section has a storage portion that stores the small piece, an outlet that discharges the small piece from the storage portion, and a shutter that opens and closes the outlet.

8 Claims, 7 Drawing Sheets

//MATERIAL SUPPLY DEVICE AND FIBER BODY GENERATION APPARATUS

The present application is based on, and claims priority from JP Application Serial Number 2019-057884, filed Mar. 26, 2019, the disclosure of which is hereby incorporated by reference herein in its entirety.

BACKGROUND

1. Technical Field

The present disclosure relates to a material supply device and a fiber body generation apparatus.

2. Related Art

In recent years, a recycling apparatus that recycles used paper has been known. For example, a recycling apparatus described in JP-A-2014-134209 includes a pulp suspension manufacturing section, a deinking section, and a papermaking section.

The pulp suspension manufacturing section has a used paper supply section and a measuring section that measures the weight of the used paper. The used paper supplied from the used paper supply section is temporarily contained in a tray, the weight of the used paper is measured, and the used paper is supplied downstream when the weight thereof reaches a desired weight.

The used paper supply section also includes a shredder tank having a discharge port that opens and closes, the discharge port enters a closed state when the weight of the used paper on the tray reaches the desired weight, and then the used paper on the tray is supplied downstream. By repeating such measurement and supply, variations in the quality of the used paper can be prevented, and the used paper can be stably manufactured.

However, when there is a variation in the thickness of the used paper supplied to the tray, the rate of weight increase per unit time of the used paper, which is discharged from the discharge port, may fluctuate. When the used paper on the tray reaches a predetermined weight and the discharge port is closed, some small pieces are supplied to the tray due to a time lag. When the rate of weight increase per unit time of the used paper supplied during the time lag fluctuates, as a result, the supply amount from the tray to the downstream may fluctuate, and the quality of the manufactured sheet may become unstable.

SUMMARY

The present disclosure can be realized in the following aspect.

According to an aspect of the present disclosure, there is provided a material supply device. The material supply device includes a supply section that supplies a small piece made of a material containing a fiber, a weight measurement section that detects a weight of the small piece supplied from the supply section to a receiving portion, and a supply amount adjustment section that adjusts a supply amount per unit time of the small piece supplied by the supply section, based on a detection result detected by the weight measurement section.

According to another aspect of the present disclosure, there is provided a fiber body generation apparatus. The fiber body generation apparatus includes the material supply device according to the present disclosure, a defibrating section that defibrates the small piece supplied from the material supply device, and a forming section that forms a defibrated material generated in the defibrating section.

DESCRIPTION OF EXEMPLARY EMBODIMENTS

Hereinafter, a material supply device and a fiber body generation apparatus according to the present disclosure will be described in detail with reference to a preferred embodiment shown in the accompanying drawings.

First Embodiment

Figure 1:
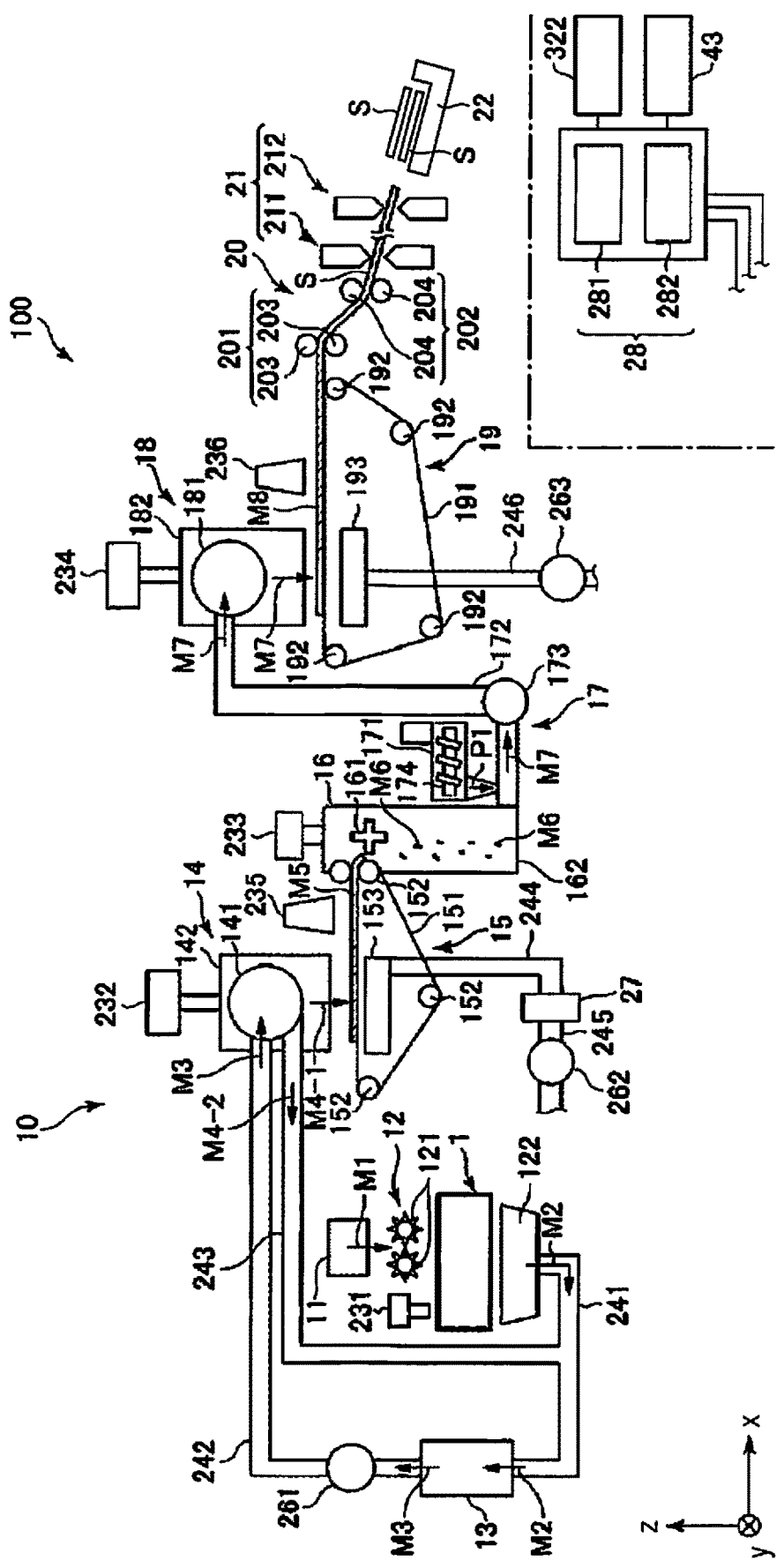
FIG. 1 is a schematic side view showing a sheet manufacturing apparatus including a material supply device according to a first embodiment of the present disclosure.
Figure 2:
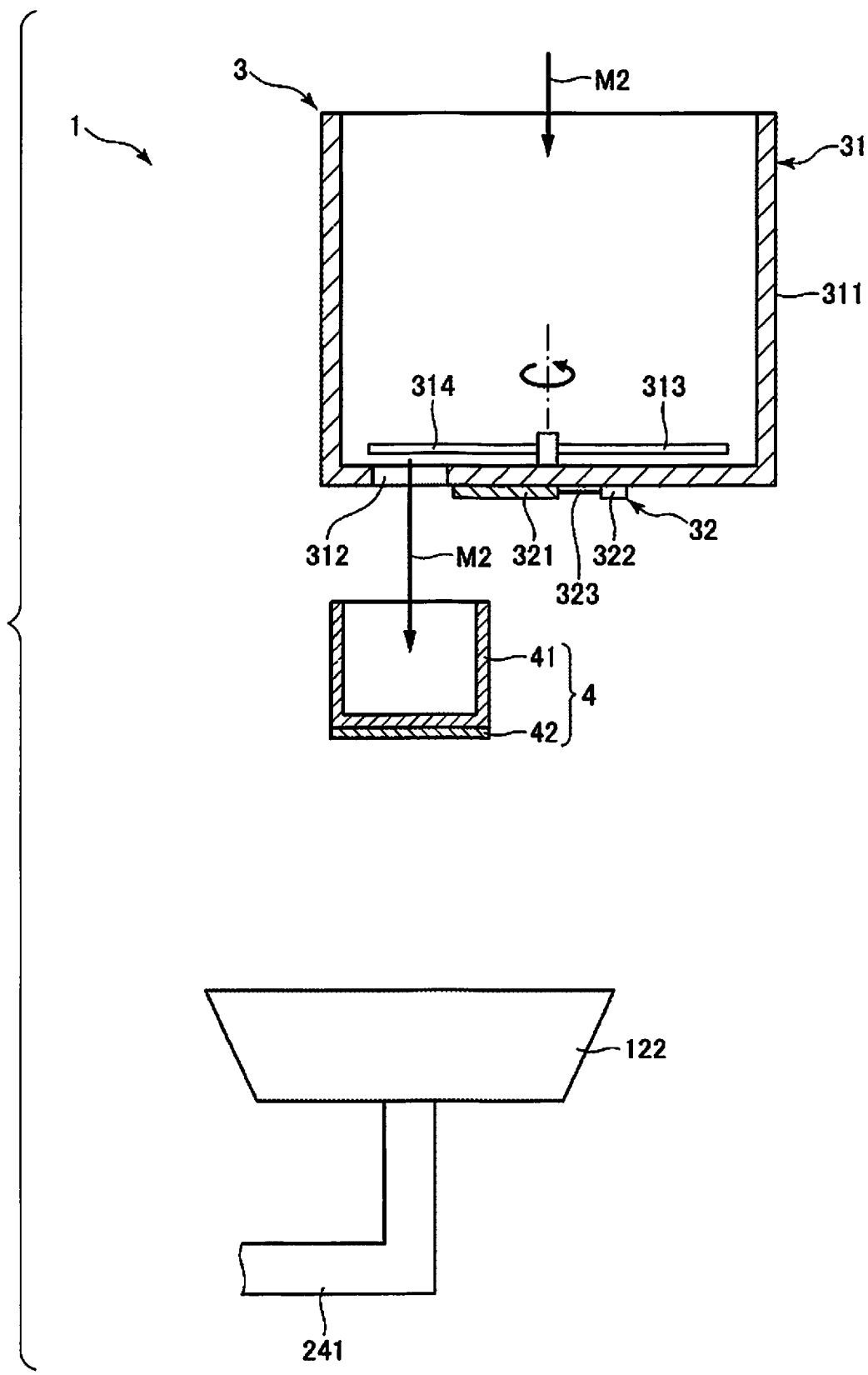
FIG. 2 is a side view of the material supply device shown in FIG. 1.
Figure 3:
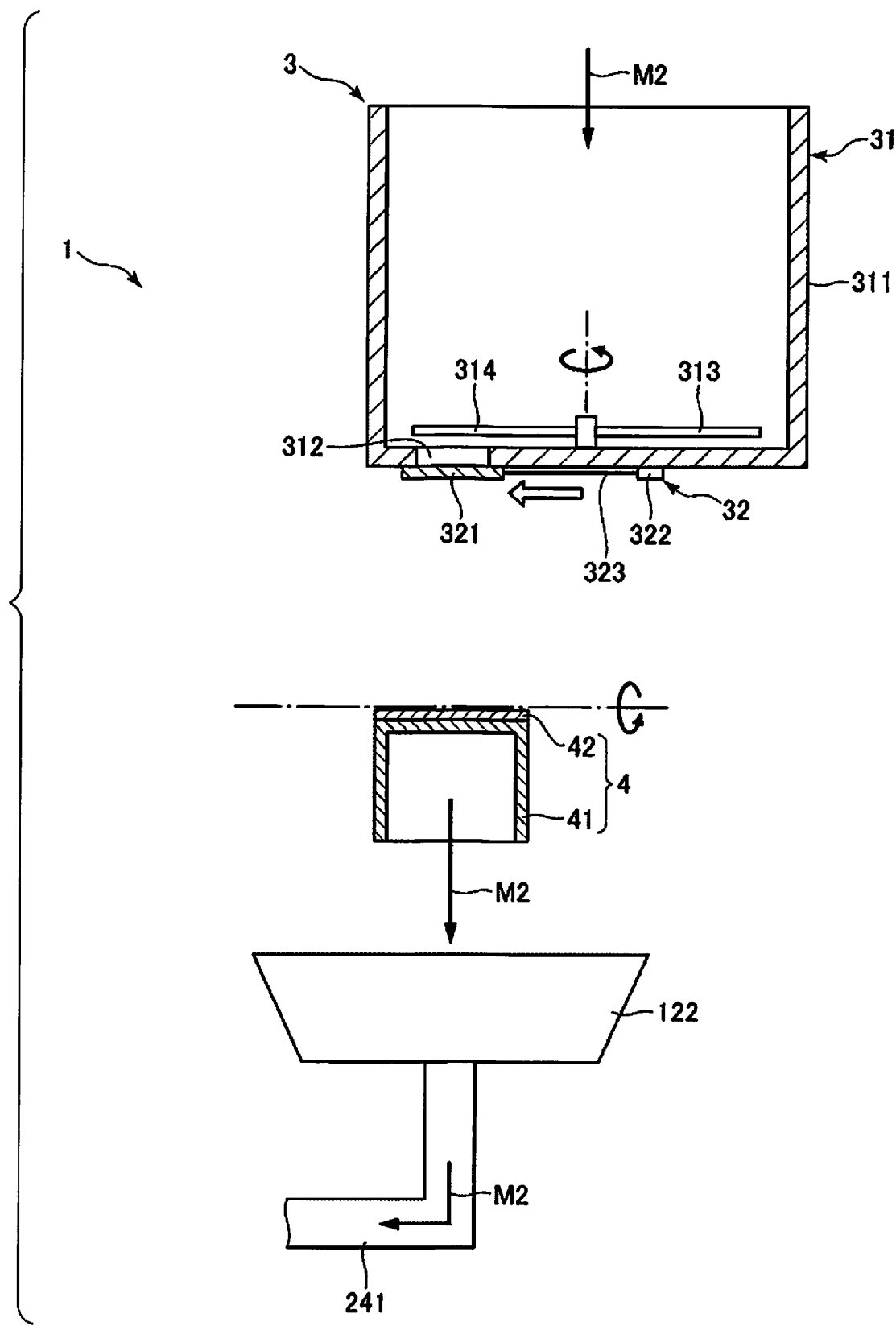
FIG. 3 is a side view of the material supply device shown in FIG. 1.
Figure 4:
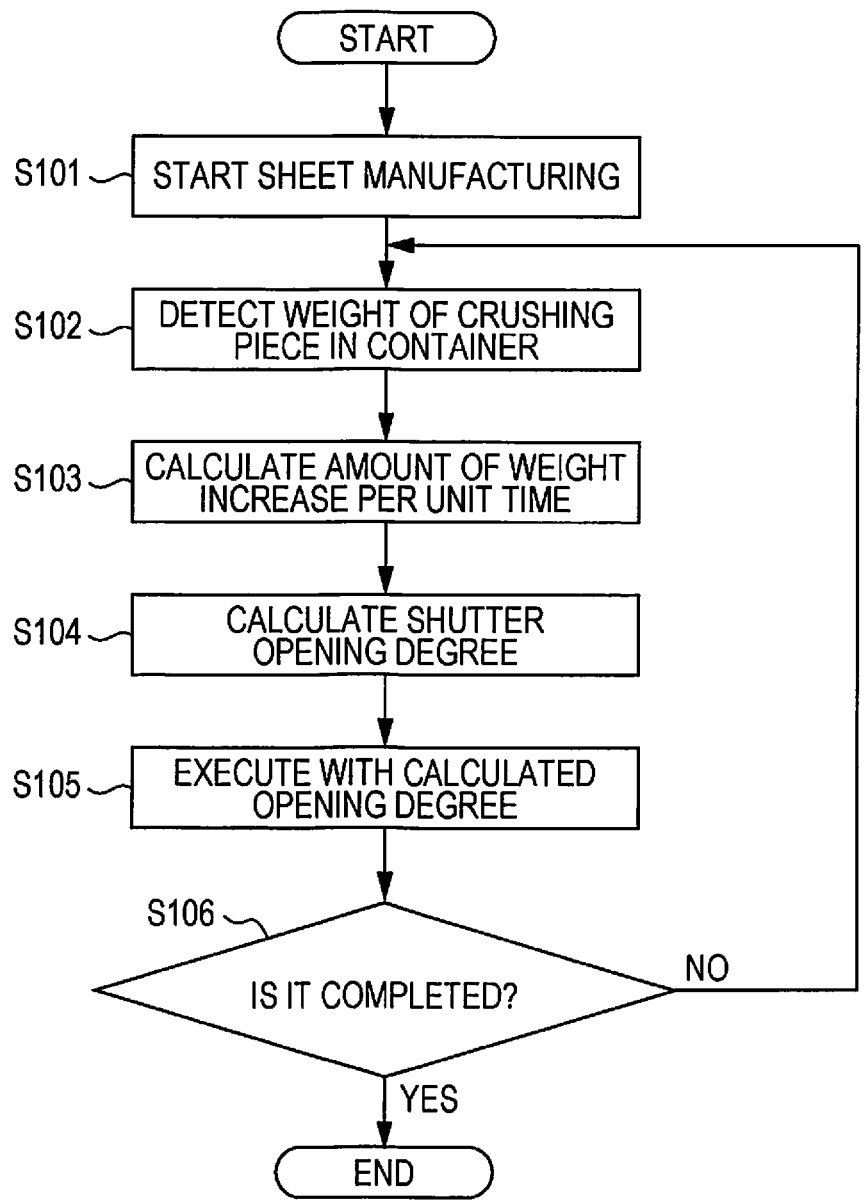
FIG. 4 is a flowchart for describing a control operation performed by a controller included in the material supply device shown in FIG. 1.

FIG. 1 is a schematic side view showing a sheet manufacturing apparatus including a material supply device according to a first embodiment of the present disclosure. FIG. 2 is a side view of the material supply device shown in FIG. 1. FIG. 3 is a side view of the material supply device shown in FIG. 1. FIG. 4 is a flowchart for describing a control operation performed by a controller included in the material supply device shown in FIG. 1. In the following, for convenience of description, as shown in FIG. 1, three axes orthogonal to each other are referred to as an x axis, a y axis, and a z axis. Further, an xy plane including the x axis and the y axis is horizontal, and the z axis is vertical. The direction in which the arrow of each axis is directed is referred to as "+", and the opposite direction is referred to as "−". In FIGS. 1 to 3, an upper side may be referred to as "up" or "above", and a lower side may be referred to as "down" or "below".

As shown in FIG. 1, a sheet manufacturing apparatus 100 includes a raw material supply section 11, a crushing section 12, a material supply device 1 according to the present disclosure, a defibrating section 13, a selecting section 14, a first web forming section 15, a subdividing section 16, a mixing section 17, a loosening section 18, a second web forming section 19, a sheet forming section 20, a cutting section 21, a stock section 22, and a collection section 27. Further, the material supply device 1 includes a controller 28, and each of the sections of the material supply device 1 and the sheet manufacturing apparatus 100 is electrically coupled to the controller 28, and the operation thereof is controlled by the controller 28. The defibrating section 13, the material supply device 1, and the sheet forming section 20 constitute a fiber body generation apparatus 10.

Further, the sheet manufacturing apparatus 100 includes a humidifying section 231, a humidifying section 232, a humidifying section 233, a humidifying section 234, a humidifying section 235, and a humidifying section 236. In addition, the sheet manufacturing apparatus 100 includes a blower 261, a blower 262, and a blower 263.

Further, in the sheet manufacturing apparatus 100, a raw material supply process, a crushing process, a defibrating process, a selecting process, a first web forming process, a dividing process, a mixing process, a loosening process, a second web forming process, a sheet forming process, and a cutting process are executed in this order.

Hereinafter, the configuration of each section will be described.

The raw material supply section 11 performs the raw material supply process which supplies a raw material M1 to the crushing section 12. The raw material M1 is a sheet-like material which consists of a fiber-containing material containing a cellulose fiber. The cellulose fiber is not particularly limited as long as it is mainly composed of cellulose (narrowly defined cellulose) as a compound and has a fibrous shape, and the fiber may contain hemicellulose and lignin in addition to cellulose (narrowly defined cellulose). Further, the raw material M1 may be in any form such as woven fabric or non-woven fabric. The raw material M1 may be, for example, recycled paper that is recycled and manufactured by defibrating used paper or YUPO paper (registered trademark) that is synthetic paper, or may not be recycled paper. In the present embodiment, the raw material M1 is used paper that has been used or that is no longer needed.

The crushing section 12 performs a crushing process of crushing the raw material M1 supplied from the raw material supply section 11 in the atmosphere or the like. The crushing section 12 has a pair of crushing blades 121 and a chute 122.

The pair of crushing blades 121 can rotate in mutually opposite directions to crush the raw material M1 between the crushing blades, that is, cut the raw material to form a crushing piece M2. The shape and size of the crushing piece M2 may be suitable for defibrating processing in the defibrating section 13, are preferably a small piece having a side length of 100 mm or less, and more preferably a small piece having a side length of 10 mm or more and 70 mm or less, for example.

The chute 122 is disposed below the pair of crushing blades 121 and has, for example, a funnel shape. Thereby, the chute 122 can receive the crushing piece M2 which is crushed by the crushing blade 121 and falls.

Further, the humidifying section 231 is disposed above the chute 122 so as to be adjacent to the pair of crushing blades 121. The humidifying section 231 humidifies the crushing piece M2 in the chute 122. The humidifying section 231 has a filter (not shown) containing moisture, and includes a vaporization type (or hot air vaporization type) humidifier that supplies humidified air with increased humidity to the crushing piece M2 by passing air through the filter. By supplying the humidified air to the crushing piece M2, it is possible to prevent the crushing piece M2 from adhering to the chute 122 and the like due to static electricity.

The chute 122 is coupled to the defibrating section 13 via a pipe 241. The crushing piece M2 collected on the chute 122 passes through the pipe 241 and is transported to the defibrating section 13.

The material supply device 1 according to the present disclosure is installed between the pair of crushing blades 121 and the chute 122. The material supply device 1 will be described in detail later.

The defibrating section 13 performs a defibrating process of defibrating the crushing piece M2 in the air, that is, in a dry manner. By the defibrating processing in the defibrating section 13, a defibrated material M3 can be generated from the crushing piece M2. Here, "defibrating" means unraveling the crushing piece M2 formed by binding a plurality of fibers into individual fibers. Then, the unraveled material is the defibrated material M3. The shape of the defibrated material M3 is linear or band shape. Further, the defibrated material M3 may exist in a state where the defibrated material is entangled and formed into a lump, that is, in a state of forming a so-called "ball".

In the present embodiment, for example, the defibrating section 13 includes an impeller mill having a rotor that rotates at a high speed and a liner that is located on the outer periphery of the rotor. The crushing piece M2 flowing into the defibrating section 13 is defibrated by being sandwiched between the rotor and the liner.

Further, the defibrating section 13 can generate a flow of air from the crushing section 12 toward the selecting section 14, that is, an air flow, by rotation of the rotor. Thereby, it is possible to suck the crushing piece M2 to the defibrating section 13 from the pipe 241. After the defibrating processing, the defibrated material M3 can be sent out to the selecting section 14 via the pipe 242.

The blower 261 is installed in the middle of the pipe 242. The blower 261 is an air flow generation device that generates an air flow toward the selecting section 14. Thereby, sending out the defibrated material M3 to the selecting section 14 is promoted.

The selecting section 14 performs the selecting process of selecting the defibrated material M3 according to the length of the fiber. In the selecting section 14, the defibrated material M3 is selected into a first selected material M4-1 and a second selected material M4-2 that is larger than the first selected material M4-1. The first selected material M4-1 has a size suitable for the subsequent manufacture of the sheet S. The average length is preferably 1 µm or more and 30 µm or less. Meanwhile, the second selected material M4-2 includes, for example, one in which defibration is insufficient, one in which the defibrated fibers are excessively aggregated, or the like.

The selecting section 14 includes a drum section 141 and a housing section 142 that houses the drum section 141.

The drum section 141 is a sieve that is formed of a cylindrical net body and that rotates around its central axis. The defibrated material M3 flows into the drum section 141. As the drum section 141 rotates, the defibrated material M3 smaller than the opening of the net is selected as the first selected material M4-1, and the defibrated material M3 having a size equal to or larger than the opening of the net is selected as the second selected material M4-2.

The first selected material M4-1 falls from the drum section 141.

Meanwhile, the second selected material M4-2 is sent out to a pipe 243 coupled to the drum section 141. The pipe 243 is coupled to the pipe 241 on the side opposite to the drum section 141, that is, on the downstream. The second selected material M4-2 that has passed through the pipe 243 merges with the crushing piece M2 in the pipe 241 and flows into the defibrating section 13 together with the crushing piece M2.

Thereby, the second selected material M4-2 is returned to the defibrating section 13, and defibrated with the crushing piece M2.

Further, the first selected material M4-1 from the drum section 141 falls while being dispersed in the air, and travels to the first web forming section 15 located below the drum section 141. The first web forming section 15 performs the first web forming process of forming a first web M5 from the first selected material M4-1. The first web forming section 15 has a mesh belt 151, three tension rollers 152, and a suction section 153.

The mesh belt 151 is an endless belt, and the first selected material M4-1 is deposited thereon. The mesh belt 151 is wound around three tension rollers 152. When the tension rollers 152 are rotationally driven, the first selected material M4-1 on the mesh belt 151 is transported toward downstream.

The first selected material M4-1 has a size equal to or larger than the opening of the mesh belt 151. Thereby, the first selected material M4-1 is restricted from passing through the mesh belt 151 and can thus be deposited on the mesh belt 151. Since the first selected material M4-1 is transported toward downstream with the mesh belt 151 in a state where the selected material is deposited on the mesh belt 151, the selected material is formed as the layered first web M5.

Further, there is a possibility that dust, dirt, and the like are mixed in the first selected material M4-1. Dust or dirt may be generated by crushing or defibration, for example. Such dust or dirt is collected at the collection section 27 which will be described later.

The suction section 153 is a suction mechanism that sucks air from below the mesh belt 151. Thereby, it is possible to suck the dust or dirt which has passed the mesh belt 151 with air.

The suction section 153 is coupled to the collection section 27 via a pipe 244. The dust or dirt sucked by the suction section 153 is collected at the collection section 27.

A pipe 245 is further coupled to the collection section 27. Further, the blower 262 is installed in the middle of the pipe 245. By the operation of the blower 262, a suction force can be generated at the suction section 153. Thereby, formation of the first web M5 on the mesh belt 151 is promoted. The first web M5 is formed by removing dust, dirt, and the like. Further, the dust or dirt passes through the pipe 244 and reaches the collection section 27 by the operation of the blower 262.

The housing section 142 is coupled to the humidifying section 232. The humidifying section 232 includes a vaporization type humidifier similar to the humidifying section 231. Thereby, the humidified air is supplied into the housing section 142. The first selected material M4-1 can be humidified with the humidified air, so that the first selected material M4-1 can be prevented from adhering to the inner wall of the housing section 142 due to electrostatic force.

The humidifying section 235 is disposed downstream of the selecting section 14. The humidifying section 235 includes an ultrasonic humidifier that sprays water. Thereby, moisture can be supplied to the first web M5, and thus the content of moisture of the first web M5 is adjusted. By the adjustment, adsorption of the first web M5 to the mesh belt 151 due to electrostatic force can be prevented. Thereby, the first web M5 is easily peeled from the mesh belt 151 at a position where the mesh belt 151 is folded back by the tension rollers 152.

The subdividing section 16 is disposed downstream of the humidifying section 235. The subdividing section 16 performs the dividing process of dividing the first web M5 peeled from the mesh belt 151. The subdividing section 16 has a propeller 161 that is rotatably supported and a housing section 162 that houses the propeller 161. Then, the first web M5 can be divided by the rotating propeller 161. The divided first web M5 becomes a subdivided body M6. Further, the subdivided body M6 descends in the housing section 162.

The housing section 162 is coupled to the humidifying section 233. The humidifying section 233 includes a vaporization type humidifier similar to the humidifying section 231. Thereby, the humidified air is supplied into the housing section 162. The humidified air can prevent the subdivided body M6 from adhering to the propeller 161 or the inner wall of the housing section 162 due to electrostatic force.

The mixing section 17 is disposed downstream of the subdividing section 16. The mixing section 17 performs the mixing process which mixes the subdivided body M6 and a resin P1. The mixing section 17 has a resin supply section 171, a pipe 172, and a blower 173.

The pipe 172 couples the housing section 162 of the subdividing section 16 and a housing section 182 of the loosening section 18 to each other and is a flow path through which a mixture M7 of the subdivided body M6 and the resin P1 passes.

The resin supply section 171 is coupled in the middle of the pipe 172. The resin supply section 171 has a screw feeder 174. When the screw feeder 174 is rotationally driven, the resin P1 can be supplied to the pipe 172 as powder or particles. The resin P1 supplied to the pipe 172 is mixed with the subdivided body M6 to become the mixture M7.

The resin P1 is obtained by binding the fibers in a later process, and for example, a thermoplastic resin, a curable resin, or the like can be used, but a thermoplastic resin is desirably used. Examples of the thermoplastic resin include an AS resin, an ABS resin, polyolefin such as polyethylene, polypropylene, or an ethylene-vinyl acetate copolymer (EVA), modified polyolefin, an acrylic resin such as polymethyl methacrylate, polyvinyl chloride, polystyrene, polyester such as polyethylene terephthalate and polybutylene terephthalate, polyamide (nylon) such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyetheretherketone, polycarbonate, polyphenylene sulfide, thermoplastic polyimide, polyetherimide, a liquid crystal polymer such as aromatic polyester, various thermoplastic elastomers such as a styrene-based thermoplastic elastomer, a polyolefin-based thermoplastic elastomer, a polyvinyl chloride-based thermoplastic elastomer, a polyurethane-based thermoplastic elastomer, a polyester-based thermoplastic elastomer, a polyamide-based thermoplastic elastomer, a polybutadiene-based thermoplastic elastomer, a trans polyisoprene-based thermoplastic elastomer, a fluoro rubber-based thermoplastic elastomer, and a chlorinated polyethylene-based thermoplastic elastomer, and the like, and one or more selected from these can be used in combination. Desirably, as the thermoplastic resin, polyester or a composition containing the polyester is used.

In addition to the resin P1, a colorant for coloring the fiber, an aggregation inhibitor for inhibiting aggregation of the fiber or aggregation of the resin P1, a flame retardant for making the fiber difficult to burn, a paper strengthening agent for enhancing the paper strength of sheet S, and the like may be supplied from the resin supply section 171. Alternatively, the above-mentioned colorant, aggregation inhibitor, flame retardant, and paper strengthening agent are contained and compounded in the resin P1 in advance, and then they may be supplied from the resin supply section 171.

In the middle of the pipe 172, the blower 173 is installed downstream of the resin supply section 171. The subdivided body M6 and the resin P1 are mixed by the action of a rotating portion such as a blade of the blower 173. Further, the blower 173 can generate an air flow toward the loosening section 18. With the air flow, the subdivided body M6 and the resin P1 can be stirred in the pipe 172. Thereby, the mixture M7 can flow into the loosening section 18 in a state where the subdivided body M6 and the resin P1 are uniformly dispersed. Further, the subdivided body M6 in the mixture M7 is loosened in the process of passing through the pipe 172, and has a finer fibrous shape.

The loosening section 18 performs the loosening process of loosening the mutually entangled fibers in the mixture M7. The loosening section 18 includes a drum section 181 and the housing section 182 that houses the drum section 181.

The drum section 181 is a sieve that is formed of a cylindrical net body and that rotates around its central axis. The mixture M7 flows into the drum section 181. When the drum section 181 rotates, fibers or the like smaller than the opening of the net in the mixture M7 can pass through the drum section 181. At that time, the mixture M7 is loosened.

The housing section 182 is coupled to the humidifying section 234. The humidifying section 234 includes a vaporization type humidifier similar to the humidifying section 231. Thereby, the humidified air is supplied into the housing section 182. The inside of the housing section 182 can be humidified with the humidified air, so that the mixture M7 can be prevented from adhering to the inner wall of the housing section 182 due to electrostatic force.

Further, the mixture M7 loosened in the drum section 181 falls while being dispersed in the air, and travels to the second web forming section 19 located below the drum section 181. The second web forming section 19 performs the second web forming process of forming a second web M8 from the mixture M7. The second web forming section 19 has a mesh belt 191, tension rollers 192, and a suction section 193.

The mesh belt 191 is an endless belt, and the mixture M7 is deposited thereon. The mesh belt 191 is wound around four tension rollers 192. When the tension rollers 192 are rotationally driven, the mixture M7 on the mesh belt 191 is transported toward downstream.

Further, most of the mixture M7 on the mesh belt 191 has a size equal to or larger than the opening of the mesh belt 191. Thereby, the mixture M7 is restricted from passing through the mesh belt 191 and can thus be deposited on the mesh belt 191. Since the mixture M7 is transported toward downstream with the mesh belt 191 in a state where the mixture is deposited on the mesh belt 191, the mixture is formed as the layered second web M8.

The suction section 193 is a suction mechanism that sucks air from below the mesh belt 191. Thereby, the mixture M7 can be sucked onto the mesh belt 191, and thus the deposition of the mixture M7 onto the mesh belt 191 is promoted.

A pipe 246 is coupled to the suction section 193. Further, the blower 263 is installed in the middle of the pipe 246. By the operation of the blower 263, a suction force can be generated at the suction section 193.

The humidifying section 236 is disposed downstream of the loosening section 18. The humidifying section 236 includes an ultrasonic humidifier similar to the humidifying section 235. Thereby, moisture can be supplied to the second web M8, and thus the content of moisture of the second web M8 is adjusted. By the adjustment, adsorption of the second web M8 to the mesh belt 191 due to electrostatic force can be prevented. Thereby, the second web M8 is easily peeled from the mesh belt 191 at a position where the mesh belt 191 is folded back by the tension rollers 192.

The total content of moisture added from the humidifying section 231 to the humidifying section 236 is preferably 0.5 parts by mass or more and 20 parts by mass or less with respect to 100 parts by mass of the material before humidification, for example.

The sheet forming section 20 is disposed downstream of the second web forming section 19. The sheet forming section 20 performs the sheet forming process of forming the sheet S from the second web M8. The sheet forming section 20 has a pressurizing section 201 and a heating section 202.

The pressurizing section 201 has a pair of calender rollers 203 and can pressurize the web M8 between the calender rollers 203 without heating the second web M8. Thereby, the density of the second web M8 is increased. As an extent of the heating in this case, for example, it is preferable that the resin P1 is not melted. The second web M8 is transported toward the heating section 202. Note that, one of the pair of calender rollers 203 is a main driving roller which is driven by the operation of a motor (not shown), and the other is a driven roller.

The heating section 202 has a pair of heating rollers 204 and can pressurize the web M8 between the heating rollers 204 while heating the second web M8. By the heat and pressure, the resin P1 is melted in the second web M8, and the fibers are bound to each other via the melted resin P1. Thereby, the sheet S is formed. The sheet S is transported toward the cutting section 21. Note that, one of the pair of heating rollers 204 is a main driving roller which is driven by the operation of a motor (not shown), and the other is a driven roller.

The cutting section 21 is disposed downstream of the sheet forming section 20. The cutting section 21 performs the cutting process of cutting the sheet S. The cutting section 21 has a first cutter 211 and a second cutter 212.

The first cutter 211 cuts the sheet S in a direction that intersects with the transport direction of the sheet S, particularly in a direction orthogonal thereto.

The second cutter 212 cuts the sheet S in a direction parallel to the transport direction of the sheet S on the downstream of the first cutter 211. The cutting is a process of removing unnecessary portions at both end portions of the sheet S (the end portions in the y axis direction) to adjust the width of the sheet S. In addition, the portion that has been removed by the cutting is referred to as a so-called "edge".

By cutting the first cutter 211 and the second cutter 212 as described above, the sheet S having a desired shape and size can be obtained. The sheet S is transported further downstream and accumulated in the stock section 22.

Each section included in such a sheet manufacturing apparatus 100 is electrically coupled to the controller 28. The operations of these sections are controlled by the controller 28.

The controller 28 has a central processing unit (CPU) 281 and a storage section 282. For example, the CPU 281 can make various determinations, various commands, and the like.

The storage section 282 stores various programs, such as a program for manufacturing the sheet S, a target value described later, various calibration curves, a table, and the like.

The controller 28 may be built in the sheet manufacturing apparatus 100 or may be provided in an external device such as an external computer. In some cases, the external device communicates with the sheet manufacturing apparatus 100 via a cable or the like, or wirelessly communicates therewith. For example, the external device is coupled to the sheet manufacturing apparatus 100 via a network such as the Internet.

Further, for example, the CPU 281 and the storage section 282 may be integrated as a single section, the CPU 281 may be built in the sheet manufacturing apparatus 100 and the storage section 282 may be provided in an external device such as an external computer, or the storage section 282 may be built in the sheet manufacturing apparatus 100 and the CPU 281 may be provided in an external device such as an external computer.

As will be described later, the controller 28 functions as a supply amount adjustment section that adjusts a supply amount per unit time of the crushing piece M2 as a small piece supplied by a supply section 3, based on a detection result detected by a weight measurement section 4.

Hereinbefore, each section of the sheet manufacturing apparatus 100 has been described.

Next, the material supply device 1 according to the present disclosure will be described.

As shown in FIG. 1, the material supply device 1 is provided between the pair of crushing blades 121 and the chute 122. As shown in FIGS. 2 and 3, the material supply device 1 includes the supply section 3 and the weight measurement section 4.

The supply section 3 has a storage portion 31 that temporarily stores the crushing piece M2 and a shutter mechanism 32. The storage portion 31 has a bottomed cylindrical storage tank 311 having a discharge port 312 at the bottom thereof, and a rotating body 313 provided at the bottom inside the storage tank 311.

The storage tank 311 has a cylindrical shape, and an upper opening thereof functions as an intake port for introducing the crushing piece M2 cut by the crushing blade 121. The discharge port 312 is a through-hole that is circular in plan view, and is provided at a position that is eccentric from the central axis of the storage tank 311.

The rotating body 313 has a plurality of blades 314 arranged in a radial pattern, and by the rotation of the blades, the crushing piece M2 inside the storage tank 311 can be stirred while being loosened and guided to the discharge port 312.

The shutter mechanism 32 has a shutter plate 321, a drive section 322 that moves the shutter plate 321, and the connecting portion 323 that connects the drive section 322 and the shutter plate 321. The shutter plate 321 has a size that can sufficiently cover the discharge port 312 in plan view. Further, by the operation of the drive section 322, the shutter plate 321 moves a first position where the shutter plate 321 is shifted from the discharge port 312 to open the discharge port 312 as shown in FIG. 2, and a second position where the shutter plate 321 overlaps the discharge port 312 to close the discharge port 312 as shown in FIG. 3.

The drive section 322 includes, for example, a motor, a solenoid, and the like, is electrically coupled to the controller 28 shown in FIG. 1, and its operation is controlled. The crushing piece M2 discharged from the discharge port 312 by the operation of the shutter mechanism 32 as described above is directed to the weight measurement section 4 located immediately below the discharge port 312.

As described above, the supply section 3 has the storage tank 311 that is a storage portion that stores the crushing piece M2 as the small piece, the discharge port 312 that is an outlet that discharges the crushing piece M2 from the storage tank 311, and the shutter mechanism 32 that opens and closes the discharge port 312.

The weight measurement section 4 has a bottomed cylindrical container 41 that is a receiving portion, and a load cell 42 that is a weight measurement section provided on the bottom side of the container 41. The container 41 temporarily stores the crushing piece M2 discharged from the discharge port 312.

The load cell 42 has a function of detecting an external force, converting the detection result into an electric signal, and outputting the electric signal. The load cell 42 is installed so as to support the container 41 from the bottom side. Thereby, the weight of the crushing piece M2 contained in the container 41 can be detected.

Further, the load cell 42 is electrically coupled to the controller 28 shown in FIG. 1, and the detection result of the load cell 42 is transmitted to the controller 28. The type of the load cell 42 is not particularly limited, and may be a magnetostrictive load cell, a capacitance load cell, a gyro-load cell, a strain gauge load cell, or the like.

The weight measurement section 4 is coupled to a rotational drive source 43 shown in FIG. 1, and the rotational drive source 43 can rotate from the state in which the opening of the container 41 faces upward as shown in FIG. 2 to the state in which the opening of the container 41 faces downward as shown in FIG. 3. Thereby, the crushing piece M2 in the container 41 can be dropped downward and supplied to the chute 122. The means for dropping the crushing piece M2 downward from the container 41 is not limited to the above-described means, and there may be an aspect having an opening and a shutter for opening and closing the opening at the bottom of the container 41, and having control for opening and closing the opening at the bottom of the container 41.

As described above, the weight measurement section 4 has the container 41 that is a containing portion that temporarily contains the crushing piece M2 as a small piece discharged from the discharge port 312, and detects the weight of the crushing piece M2 in the container 41. Thereby, the weight of the crushing piece M2 can be accurately detected.

With the material supply device 1 as described above, the crushing piece M2 having a desired weight can be measured, and supplied to the chute 122. Thereby, since the crushing piece M2 can be supplied to the downstream without excess or deficiency, an appropriate amount of fibers is processed in each section from the defibrating section 13 to the loosening section 18. Therefore, since it is possible to prevent the occurrence of unevenness in the thickness and strength of each sheet S, and the occurrence of unevenness in the thickness and strength of one sheet S, a relatively high quality sheet S can be stably manufactured.

Here, the raw material M1 supplied to the raw material supply section 11 shown in FIG. 1 is selected by the user and loaded into the raw material supply section 11. Therefore, there is a possibility that the thickness, strength, paper quality, material of the crushing pieces M2 are different one by one. That is, the weight of the crushing pieces M2 may not be the same one by one. In this case, the following problems may occur.

As described above, the crushing piece M2 is supplied into the container 41 while detecting the weight of the crushing piece M2 in the container 41, and when the weight thereof reaches a desired weight, the discharge port 312 is closed and the supply is stopped. At this time, the controller 28 drives the drive section 322 to close the discharge port 312 with the shutter plate 321, but there is a time lag from when a signal is transmitted to the drive section 322 until the shutter plate 321 actually closes the discharge port 312. While the shutter plate 321 actually closes the discharge port 312 due to the time lag, the crushing piece M2 is supplied to the container 41 although it is a small amount. It is possible to set a desired weight while anticipating the excess supply amount. However, as described above, since the weight of each of the crushing pieces M2 may not be the same, there is a possibility that the weight of the crushing pieces M2 loaded in the container 41 may greatly vary. Due to this variation, the thickness and strength of one sheet S may be uneven or the thickness and strength of each sheet S may be different.

Therefore, the present disclosure has the following configuration.

The material supply device 1 has the supply section 3 that supplies the crushing piece M2 as a small piece made of a material containing the fiber, the weight measurement section 4 that detects the weight of the crushing piece M2 supplied from the supply section 3 to the container 41 as a receiving portion, and the controller 28 as a supply amount adjustment section that adjusts the supply amount per unit time of the crushing piece M2 supplied by the supply section 3 based on the detection result detected by the weight measurement section 4. Thereby, the supply amount per unit time of the crushing piece M2 can be adjusted according to the weight of the crushing piece M2, and the crushing piece M2 can be supplied without excess or deficiency. As a result, a high quality sheet S can be stably manufactured.

Hereinafter, the above contents will be described in detail with reference to the flowchart shown in FIG. 4.

First, in step S101, sheet manufacturing is started, that is, supply of the raw material M1 is started. Thereby, the discharge port 312 is opened, and the crushing piece M2 is supplied into the container 41 as shown in FIG. 2.

Next, in step S102, the weight of the crushing piece M2 in the container 41 is detected. Then, when the weight of the crushing piece M2 in the container 41 reaches the target value, the discharge port 312 is closed and the container 41 is rotated as shown in FIG. 3. The target value is a value stored in advance in the storage section 282.

Then, in step S103, the amount of weight increase per unit time of the crushing piece M2 is calculated. The amount of weight increase can be calculated based on, for example, the target value and the time from the start to the completion of weight detection. The larger the amount of weight increase, the greater the weight of the crushing piece M2 that increases with a time lag.

Next, in step S104, a shutter opening degree is calculated, that is, an opening degree of the discharge port 312 is calculated. This step is performed based on a calibration curve indicating the relationship between the amount of weight increase per unit time and the shutter opening degree. The calibration curve is, for example, experimentally calculated, and is stored in the storage section 282 in advance.

In step S105, the process is executed with the shutter opening degree determined in step S104. That is, when the amount of weight increase per unit time is relatively large, that is, the thickness of the crushing piece M2 is relatively thick, the shutter opening degree is set relatively small. Meanwhile, when the amount of weight increase per unit time is relatively small, that is, the thickness of the crushing piece M2 is relatively thin, the shutter opening degree is set relatively large. As described above, by setting an appropriate shutter opening degree according to the amount of weight increase per unit time, the supply amount of the crushing piece M2 from the supply section 3 can be appropriately adjusted, and the weight of the crushing piece M2 that increases with a time lag can be kept as constant as possible. Therefore, the fiber can be supplied to the defibrating section 13 and the subsequent sections without excess or deficiency. Therefore, since it is possible to more effectively prevent or suppress the occurrence of unevenness in the thickness and strength of each sheet S, and the occurrence of unevenness in the thickness and strength of one sheet S, a high quality sheet S can be stably manufactured.

In step S106, it is determined whether or not the sheet manufacturing is completed. The determination is made based on the number of the processed raw materials M1, the accumulated operating time, the operator's end instruction, and the like. In step S106, when it is determined that the process has not been completed, the process returns to step S102, and the following steps are sequentially repeated.

By repeating the steps as described above, intermittently, the fiber can be continuously supplied to the defibrating section 13 and the subsequent sections without excess or deficiency.

Further, by storing the relationship between the amount of weight increase per unit time and the shutter opening degree every time the shutter opening degree is changed, these relationship tendencies, such as standard deviation may be used for the subsequent adjustment of the shutter opening degree. Thereby, it can be more accurately adjusted to the appropriate shutter opening degree.

As described above, the controller 28 as a supply amount adjustment section adjusts the supply amount per unit time of the crushing piece M2 as a small piece by adjusting the opening and closing condition of the shutter mechanism 32, specifically, the shutter opening degree. Thereby, the supply amount of the crushing piece M2 from the supply section 3 can be appropriately adjusted by the simple configuration that the opening and closing condition of the shutter mechanism 32 is changed. As a result, a high quality sheet S can be more stably manufactured.

Although the shutter opening degree has been described above as an example of the opening and closing condition of the shutter mechanism 32, the effects of the present disclosure can also be obtained by adjusting an opening and closing speed, an opening and closing timing, and the like of the shutter. Further, two or more of these may be simultaneously adjusted.

The controller 28 as a supply amount adjustment section adjusts the opening and closing condition of the shutter mechanism 32 based on an increase amount per unit time in the weight of the crushing piece M2 as the small piece detected by the weight measurement section 4. Thereby, the weight of the crushing piece M2 that increases with a time lag can be kept as constant as possible. As a result, a high quality sheet S can be more stably manufactured.

The fiber body generation apparatus 10 includes the material supply device 1, the defibrating section 13 that defibrates a crushing piece M2 as the small piece supplied from the material supply device 1, and the sheet forming section 20 as a forming section that forms the defibrated material M3 generated in the defibrating section 13. Thereby, the sheet S can be manufactured appropriately and efficiently while taking the advantages of the material supply device 1 described above.

Second Embodiment

Figure 5:
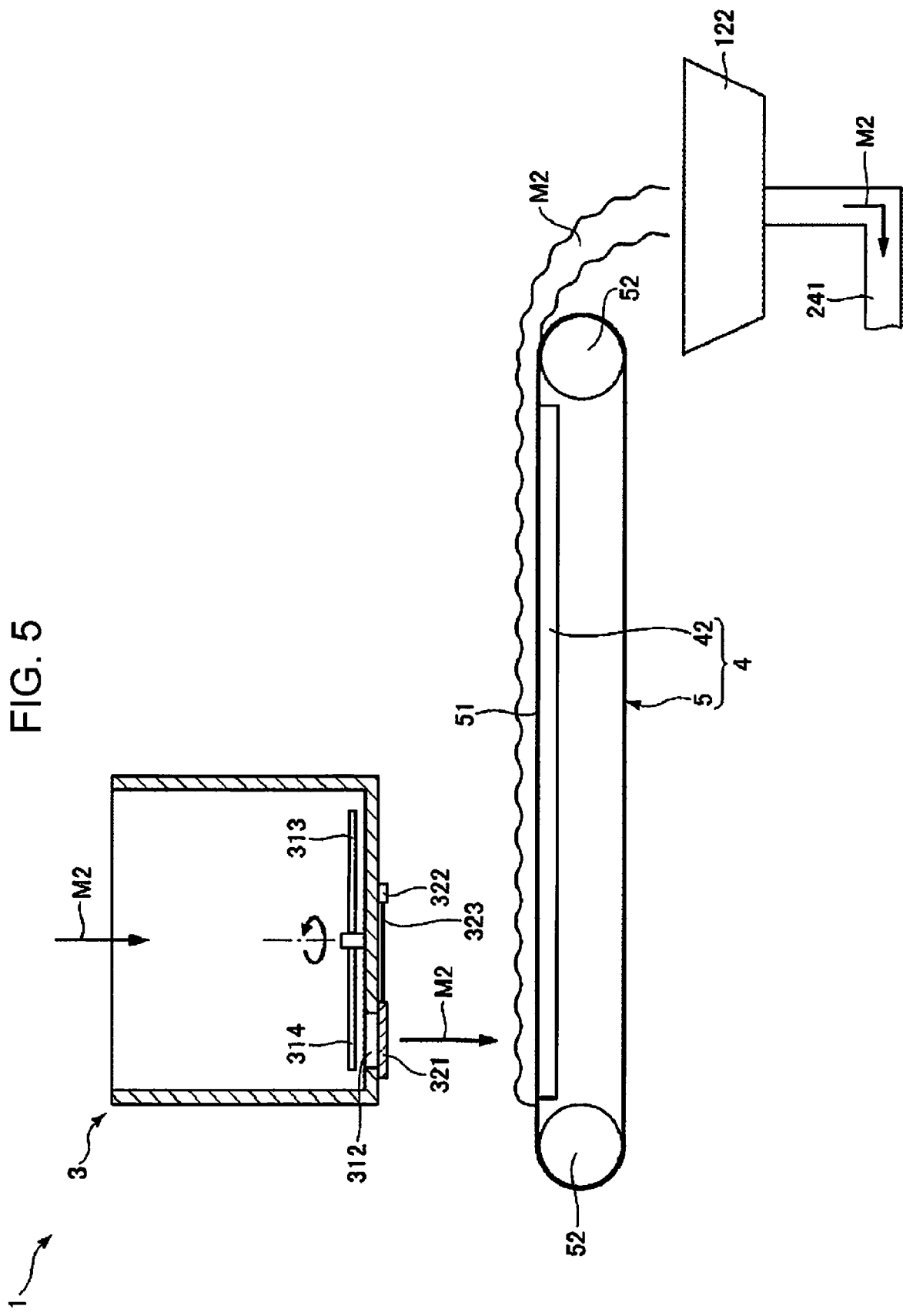
FIG. 5 is a side view of a material supply device according to a second embodiment of the present disclosure.
Figure 6:
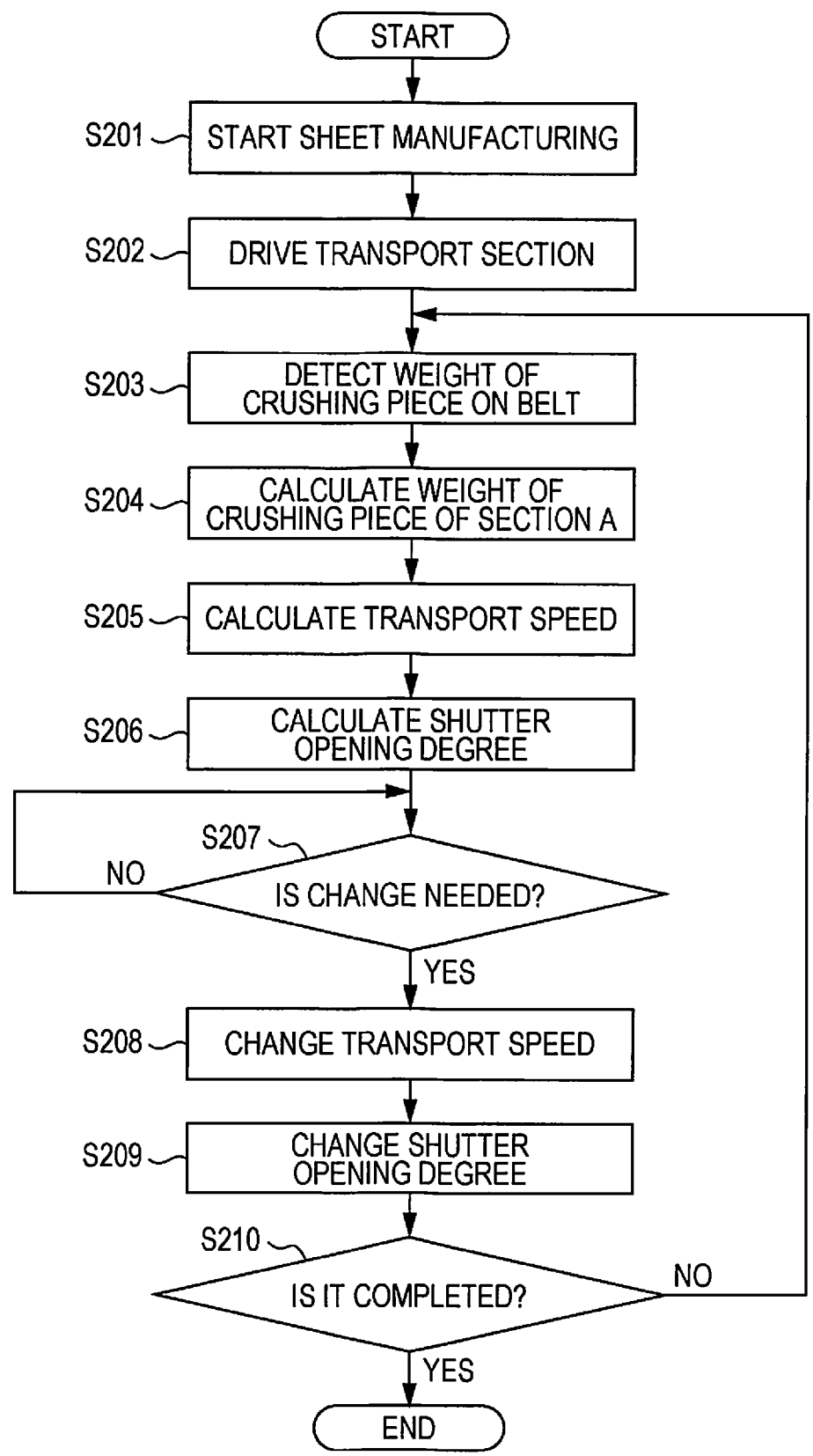
FIG. 6 is a flowchart for describing a control operation performed by a controller included in the material supply device according to the second embodiment of the present disclosure.
Figure 7:
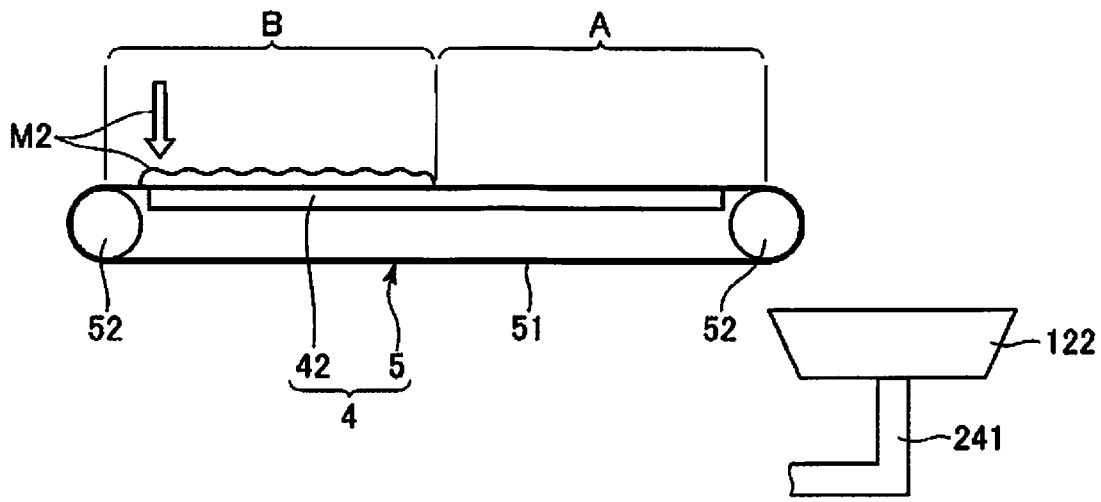
FIG. 7 is a side view of a transport section shown in FIG. 5.
Figure 8:
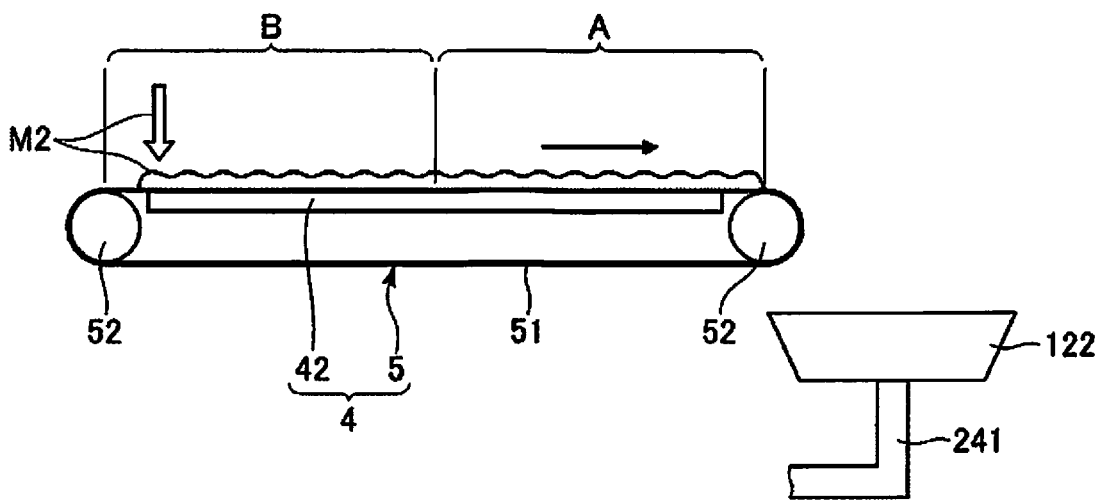
FIG. 8 is a side view of the transport section shown in FIG. 5.
Figure 9:
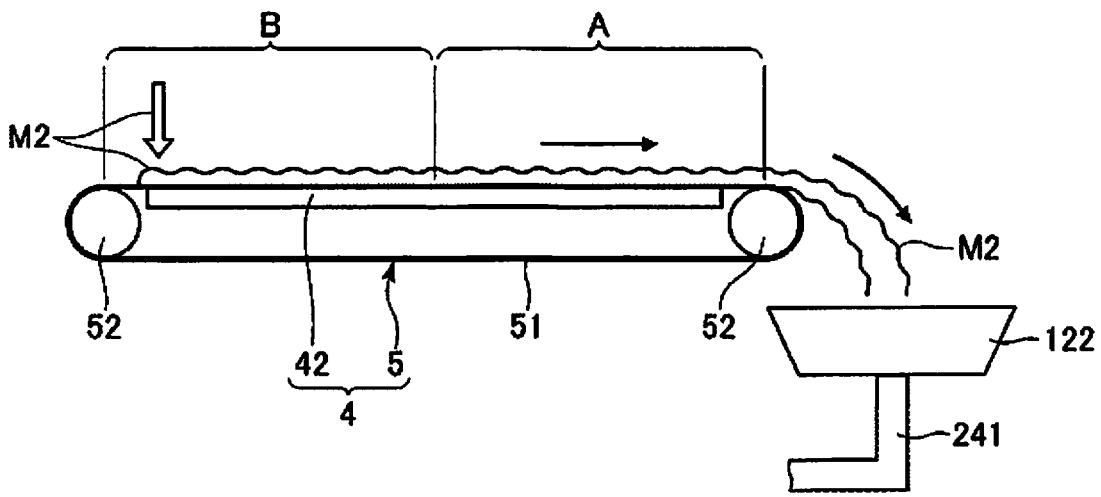
FIG. 9 is a side view of the transport section shown in FIG. 5.

FIG. 5 is a side view of a material supply device according to a second embodiment of the present disclosure. FIG. 6 is a flowchart for describing a control operation performed by a controller included in the material supply device according to the second embodiment of the present disclosure. FIG. 7 is a side view of a transport section shown in FIG. 5. FIG. 8 is a side view of the transport section shown in FIG. 5. FIG. 9 is a side view of the transport section shown in FIG. 5.

The material supply device and the fiber body generation apparatus according to the second embodiment of the present disclosure will be described below with reference to FIGS. 5 to 9, but the description will focus on the differences from the above-described embodiment, and the description of the same matters will not be repeated.

The present embodiment is the same as the first embodiment except that it includes a transport section.

As shown in FIG. 5, in the present embodiment, the material supply device 1 includes a supply section 3, a weight measurement section 4, and a transport section 5 which is a receiving portion. In other words, the receiving portion has the transport section 5. The supply section 3 has the same configuration as that of the first embodiment. The weight measurement section 4 has a load cell 42. In the present embodiment, this load cell 42 detects the weight of a crushing piece M2 on the belt of the transport section 5.

The transport section 5 has a belt 51 and a roller 52 around which the belt 51 is wound and which is rotationally driven. The belt 51 is an endless belt, and is circulated and rotated by the rotation of the roller 52. Further, the crushing piece M2 supplied from the supply section 3 falls and is deposited on the belt 51.

Two rollers 52 are provided, and arranged side by side along the horizontal direction. One of the two rollers 52 is a main driving roller coupled to a motor, and the other is a driven roller. The main driving roller is electrically coupled to the controller 28 shown in FIG. 1, and the operation thereof is controlled.

In such a transport section 5, when the roller 52 rotates, the belt 51 circulates and rotates, and the crushing piece M2 on the belt 51 is transported to the right side in FIG. 5. When the crushing piece M2 reaches a folded portion of the belt 51, the crushing piece falls downward as it is and is supplied into the chute 122.

Further, the rotation speed of the motor coupled to the roller 52 is variable by changing the energization condition. Thereby, the transport speed of the crushing piece M2 on the belt 51 can be adjusted.

As described above, the transport section 5 has the belt 51 and the roller 52 around which the belt 51 is wound and which is rotationally driven, and the controller 28 that is a transport speed adjustment section adjusts the rotation speed of the roller 52. Thereby, the effect of the present disclosure as described later can be exhibited by the simple method of adjusting the rotation speed of the roller.

As the configuration of the transport section 5, it is not limited to the configuration of the belt transport as described above, for example, a vibration feeder and a table feeder may be included.

As described above, the receiving portion has the transport section 5 that transports the crushing piece M2 as the small piece, the weight measurement section 4 detects the weight of the crushing piece M2 transported by the transport section 5, and includes the controller 28 as a transport speed adjustment section that adjusts the transport speed of the transport section 5 based on the detection result detected by the weight measurement section 4. Thereby, the supply amount per unit time of the crushing piece M2 can be adjusted according to the weight of the crushing piece M2, and the crushing piece M2 can be supplied without excess or deficiency. As a result, a high quality sheet S can be stably manufactured.

Hereinafter, the above contents will be described in detail with reference to the flowchart shown in FIG. 6 and FIGS. 7 to 9.

First, in step S201, sheet manufacturing is started, that is, supply of the raw material M1 is started. Next, in step S202, the belt 51 is driven, and in step S203, detection of the weight of the crushing piece M2 on the belt 51 is started. Through such steps S201 to S203, the discharge port 312 is opened, and the crushing piece M2 is deposited on the belt 51 as shown in FIG. 7.

In the present embodiment, the belt 51 is divided into two sections, that is, a downstream section A and an upstream section B, and the weight is measured. Specifically, in step S204, as shown in FIG. 7, in the state where the crushing piece M2 is deposited and transported to the entire area of the section B of the belt 51, the weight of the crushing piece M2 deposited in the section B is detected and stored. Next, as shown in FIG. 8, in the state where the crushing piece M2 is deposited and transported to the entire area of the section A of the belt 51, the weight of the crushing piece M2 deposited in the section A and the section B is detected and stored. Based on these weights, that is, the difference between the weights is the weight of the crushing piece M2 deposited in the section B.

Next, in step S205, the transport speed of the crushing piece M2 deposited in the section A, that is, the speed at which the crushing piece M2 deposited in the section A is dropped is calculated. This calculation is performed based on the calibration curve indicating the relationship between the weight and the transport speed of the crushing piece M2 deposited in the section A. The calibration curve is experimentally obtained, and is stored in the storage section 282 in advance.

In the configuration shown in the figure, the circumstance immediately after the start of sheet manufacturing is described. However, when such a transport process is performed for a relatively long time, and past adjustment data is accumulated, it is effective to perform prediction-control based on the past deviation by so-called proportional-integral-derivative (PID) control. Thereby, the transport amount per unit time of the crushing piece M2, that is, the supply amount of the crushing piece M2 to the chute 122 can be more favorably adjusted, and the crushing piece M2 can be supplied without excess or deficiency.

Next, in step S206, the weight per unit time of the crushing piece M2 supplied to the belt 51 is calculated based on the transport speed calculated in step S205. The shutter opening degree of the shutter mechanism 32 installed at the discharge port 312 is calculated based on the weight per unit time thereof. This calculation performs prediction-control based on the past deviation by PID control. Thereby, the appropriate shutter opening degree based on the current transport speed of the belt 51 can be accurately calculated.

Next, in step S207, when the crushing piece M2 located in the section B is transported through the section A, it is determined whether or not adjustment of the transport speed and the shutter opening degree is necessary. When the current transport speed and the transport speed calculated in step S205 is different from each other, in step S208, the current transport speed is changed to the transport speed calculated in step S205, and when the current shutter opening degree and the shutter opening degree calculated in step S206 is different from each other, in step S209, the current shutter opening degree is changed to the shutter opening degree calculated in step S206.

Here, for example, if the transport speed is simply reduced, the thickness of a deposit in the crushing piece M2 deposited in the section B will increase, but as described above, such a problem can be prevented because the shutter opening degree is also adjusted as the transport speed decreases. Further, in order to control the transport speed and the shutter opening degree, and to converge, that is, to stably control both the transport speed and the shutter opening degree, it is preferable to perform prediction-control based on the past deviation by PID control. Thereby, while stably controlling both the transport speed and the shutter opening degree, the supply amount of the crushing piece M2 to the chute 122 can be more favorably adjusted, and the crushing piece M2 can be supplied without excess or deficiency.

In step S210, it is determined whether or not the sheet manufacturing is completed. The determination is made based on the number of the processed raw materials M1, the accumulated operating time, the operator's end instruction, and the like. In step S210, when it is determined that the process has not been completed, the process returns to step S203, and the following steps are sequentially repeated.

Hereinbefore, the material supply device and the fiber body generation apparatus according to the present disclosure have been described with reference to the illustrated embodiment, but the present disclosure is not limited thereto and each section constituting the material supply device and the fiber body generation apparatus can be replaced with any section that can implement the same function. Further, any components may be added.

The material supply device and the fiber body generation apparatus according to the present disclosure may be a combination of any two or more configurations or features of the above embodiments.

In each of the above embodiments, the case where the material supply device and the fiber body generation apparatus are applied to a dry sheet manufacturing apparatus has been described as an example, but the present disclosure is not limited thereto. For example, the material supply device and the fiber body generation apparatus may be applied to a wet sheet manufacturing apparatus. Further, they are not limited to a sheet manufacturing apparatus, and may be applied to an apparatus which manufactures another forming body.

What is claimed is:

1. A material supply device comprising:
   a supply section including
      a storage portion that stores small pieces made of a material containing a fiber,
      an outlet that discharges the small pieces from the storage portion, and
      a shutter that opens and closes the outlet;
   a weight measurement section including
      a receiving portion having a receiving surface, and
      a sensor that detects a weight of the small pieces supplied from the supply section to the receiving portion; and
   a controller that adjusts a supply amount per unit time of the small pieces supplied by the supply section, based on a detection result detected by the weight measurement section.

2. The material supply device according to claim 1, wherein
   the controller adjusts the supply amount per unit time of the small pieces by adjusting an opening and closing condition of the shutter.

3. The material supply device according to claim 2, wherein
   the supply amount adjustment section adjusts the opening and closing condition of the shutter based on an increase amount per unit time in the weight of the small pieces detected by the sensor of the weight measurement section.

4. A fiber body generation apparatus comprising:
   the material supply device according to claim 1;
   a defibrating section that defibrates the small pieces supplied from the material supply device; and
   a forming section that forms a defibrated material generated in the defibrating section.

5. The material supply device according to claim 1, wherein
   the receiving portion includes a transport section including the receiving surface that transports the small piece,
   the weight measurement section detects the weight of the small pieces transported by the transport section, and
   the controller adjust a transport speed of the transport section based on the detection result detected by the sensor of the weight measurement section.

6. The material supply device according to claim 5, wherein
   the transport section includes a belt and a roller around which the belt is wound and which is rotationally driven, and
   the controller adjusts a rotation speed of the roller.

7. A material supply device comprising:
   a supply section including a storage portion that stores small pieces made of a material containing a fiber, and an outlet that discharges the small pieces from the storage portion;
   a weight measurement section including a receiving portion with a receiving surface and a sensor that detects a weight of the small piece supplied from the supply section to the receiving portion; and
   a controller that adjusts a supply amount per unit time of the small pieces supplied by the supply section, based on a detection result detected by the weight measurement section, wherein
   the receiving portion includes a transport section including the receiving surface that transports the small piece,
   the weight measurement section detects the weight of the small pieces transported by the transport section, and
   the controller adjust a transport speed of the transport section based on the detection result detected by the sensor of the weight measurement section.

8. The material supply device according to claim 7, wherein
   the transport section includes a belt and a roller around which the belt is wound and which is rotationally driven, and
   the controller adjusts a rotation speed of the roller.

* * * * *